(12) United States Patent
Gonioukh et al.

(10) Patent No.: US 6,844,408 B2
(45) Date of Patent: Jan. 18, 2005

(54) PREPARATION OF POLYETHYLENE

(75) Inventors: Andrei Gonioukh, Liblar (DE); Lars Wittkowski, Mannheim (DE); Thomas Dröge, Neustadt (DE); Ernst Fischer, Speyer (DE); Roger Klimesch, Alsbach-Hähnlein (DE); Philipp Rosendorfer, Neustadt (DE); Gernot Köhler, Meckenheim (DE); Dieter Littmann, Mücke (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/221,202

(22) PCT Filed: Mar. 13, 2001

(86) PCT No.: PCT/EP01/02796
§ 371 (c)(1),
(2), (4) Date: Mar. 14, 2003

(87) PCT Pub. No.: WO01/68723
PCT Pub. Date: Sep. 20, 2001

(65) Prior Publication Data
US 2004/0214971 A1 Oct. 28, 2004

(30) Foreign Application Priority Data
Mar. 16, 2000 (DE) .......................................... 100 12 727

(51) Int. Cl.⁷ ................................................. C08F 4/38
(52) U.S. Cl. ........................ 526/228; 526/64; 526/352
(58) Field of Search .......................... 526/228, 64, 352

(56) References Cited

U.S. PATENT DOCUMENTS

| | | | |
|---|---|---|---|
| 4,135,044 A | * | 1/1979 | Beals .......................... 526/64 |
| 4,175,169 A | | 11/1979 | Beals et al. ................... 526/64 |
| 5,376,739 A | | 12/1994 | Pfleger et al. ................ 526/64 |
| 5,907,022 A | * | 5/1999 | Stigter et al. ............... 526/228 |

FOREIGN PATENT DOCUMENTS

| | | |
|---|---|---|
| EP | 0 121 755 | 10/1984 |
| EP | 0 573 870 | 12/1993 |
| EP | 0 813 550 | 12/1997 |
| WO | WO 00/01740 | 1/2000 |

* cited by examiner

*Primary Examiner*—Ling-Siu Choi
(74) *Attorney, Agent, or Firm*—Keil & Weinkauf

(57) ABSTRACT

Ethylene homopolymers and copolymers are prepared in a tube reactor at from 160° C. to 350° C. and pressures in the range from 500 to 5000 bar, with or without use of molar mass regulators, using a peroxide mixture comprising from 1 to 95 mol %, based on the total amount of the peroxide mixture, of at least one cyclic peroxide of the formula I,

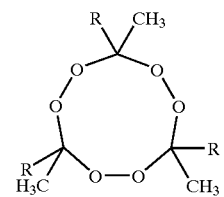

where the radicals R are identical or different and are selected from among alkyl groups and aryl groups, as polymerization initiator.

6 Claims, No Drawings

PREPARATION OF POLYETHYLENE

The present invention relates to a process for preparing ethylene homopolymers and copolymers in a tube reactor at from 160° C. to 350° C. and pressures in the range from 500 to 5000 bar, with or without use of molar mass regulators, wherein a peroxide mixture comprising from 1 to 95 mol %, based on the total amount of the peroxide mixture, of at least one cyclic peroxide of the formula

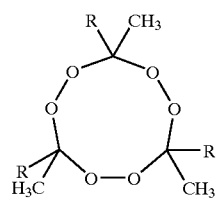

I where the radicals R are identical or different and are selected from among alkyl groups and aryl groups, is used as polymerization initiator.

The high-pressure polymerization process is a tried and tested process for producing low density polyethylene (LDPE) which is carried out industrially in numerous plants worldwide with great success. Initiation of the polymerization in the high-pressure polymerization is usually effected by means of atmospheric oxygen, by means of peroxides, by means of other free-radical initiators or by means of mixtures of these. In practice, it has been found to be particularly advantageous to initiate the polymerization reaction simultaneously at a plurality of points within the reactor and thus to keep the reactor yield high and the product quality at a uniformly high level. For this purpose, the free-radical chain initiators used for initiating the polymerization have to be added to the reaction medium in an appropriate manner.

In order to increase the capacity of existing reactors, efforts are made to achieve very high conversions. However, limiting factors are the polymerization temperature and the polymerization pressure, which have a specific upper limit depending on the product type. In addition, spontaneous ethylene decomposition can occur at above about 350° C.

Selection of the polymerization initiator enables the conversion to be increased within certain limits. It is desirable to have polymerization initiators which decompose quickly but can nevertheless be handled safely. A good method of testing the decomposition rate of a polymerization initiator in the high-pressure process is to record the temperature profile. For this purpose, the temperature profile in the polymerization in the high-pressure tube reactor is plotted over the reactor length. Immediately after the first introduction of initiator, the temperature rises steeply due to the enthalpy liberated in the polymerization reaction and then drops again. After the temperature has dropped by about 20–100° C., more initiator is introduced and the temperature again rises steeply and then drops again. This procedure is repeated a number of times, depending on the number of reaction zones. The decisive indication of the complete reaction of a peroxide is the cooling curve which in the case of complete decomposition is steeper than in cases in which proportions of the peroxide remain in the reaction mixture even after going through the temperature maximum.

The reaction is generally carried out with a plurality of peroxides of which at least one decomposes at comparatively low temperature being metered in initially at the starting point, i.e. at the beginning of the reactor.

EP-B 0 813 550 teaches that cyclic peroxo compounds of the formulae $P^1$ to $P^3$ are particularly well suited to polymerizing styrene or acrylates. Furthermore, it is disclosed that these can also be used for the polymerization of ethylene. The radicals $R^1$ to $R^6$ are, independently of one another, hydrogen, $C_1$–$C_{20}$-alkyl, $C_3$–$C_{20}$-cycloalkyl, $C_6$–$C_{20}$-aryl, $C_7$–$C_{20}$-aralkyl or $C_7$–$C_{20}$-alkaryl, where the radicals $R^1$ to $R^6$ may also bear substituents such as alkyl, aryl, alkoxy, aryloxy, hydroxy, carboxyl, hydroxyl, halogen, nitrile or amido.

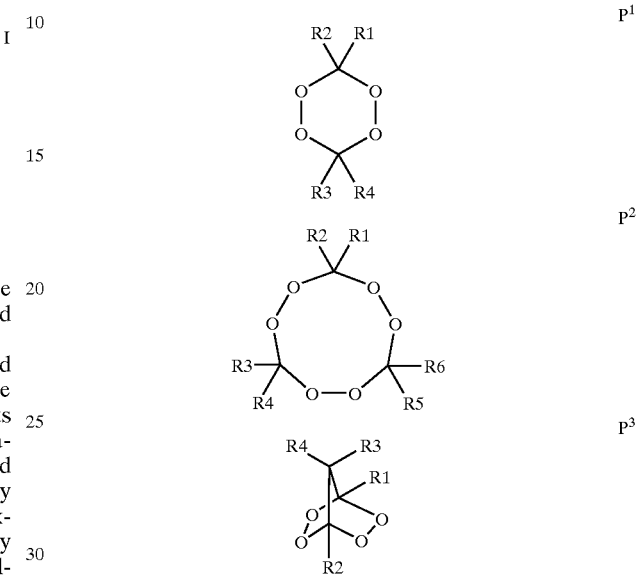

It has been found that the conversion when using the most important conventional polymerization initiators is still too low. The most important conventional polymerization initiators are dibenzoyl peroxide, di-tert-butyl peroxide (DTBP), tert-butyl perpivalate (TBPP) and tert-butyl perisononanoate (TBPIN). If the conversion is too low, the economics of the high-pressure process are adversely affected. When using the peroxides of the formulae $P^1$ to $P^3$, the conversions are still too low for most of these compounds or the amount of initiator required to achieve a good conversion is too high.

It is an object of the present invention to provide a process by means of which the conversion in the high-pressure polymerization of ethylene is increased further or the consumption of initiator is reduced.

We have found that this object is achieved by a process for preparing ethylene homopolymers and copolymers in a tube reactor at from 160° C. to 350° C. and pressures in the range from 500 to 5000 bar, with or without use of molar mass regulators, wherein a peroxide mixture comprising from 1 to 95 mol %, based on the total amount of the peroxide mixture, of at least one cyclic peroxide of the formula I,

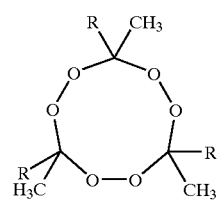

I where the radicals R are identical or different and are selected from among alkyl groups and aryl groups, is used as polymerization initiator. R is preferably a linear, branched or cyclic $C_1$–$C_{20}$ alkyl or a $C_6$–$C_{18}$-aryl. In particular, R is selected from among $C_1$–$C_8$-alkyl such as methyl, ethyl, n-propyl, isopropyl, n-butyl, sec-butyl, isobutyl, tert-butyl, n-pentyl, sec-pentyl, isopentyl, n-hexyl, cyclohexyl, n-heptyl or n-octyl, preferably linear $C_1$–$C_6$-alkyl such as methyl, ethyl, n-propyl, n-butyl, n-pentyl, n-hexyl or isohexyl, particularly preferably linear $C_1$–$C_4$-alkyl such as methyl, ethyl, n-propyl or n-butyl; all three radicals are particularly preferably ethyl; and $C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

The preparation of such trimeric ketone peroxides can be carried out by condensation of the corresponding ketones with hydrogen peroxide in the presence of strong mineral acids and is described in the literature (for example R. Criegee, in *Methoden der Organischen Chemie* (Houben-Weyl), Vol. 8, p. 46, Georg-Thieme-Verlag Stuttgart 1952 or in EP-A 0 813 550).

The mixtures used according to the present invention as polymerization initiator comprise A) from 1 to 95 mol % of one or more trimeric ketone peroxides as peroxides decomposing at high temperature, preferably from 2 to 50 mol % and particularly preferably from 3 to 30 mol %, and B) from 5 to 99 mol % of one or more conventional polymerization initiators, preferably from 50 to 98 mol % and particularly preferably from 70 to 97 mol %, in each case based on the total amount of the peroxide mixture.

The polymerization is initiated in each reaction zone by addition of initiators which decompose into free radicals, with the peroxide mixtures according to the present invention being used in at least one reaction zone. The peroxide mixtures according to the present invention are preferably used in a plurality of reaction zones or in every reaction zone. As component B), it is possible to use any polymerization initiators such as peroxides, preferably organic peroxides, which decompose into free radicals, air or oxygen.

B) preferably comprises one or more conventional peroxides. The peroxide mixtures according to the present invention are made up so that they comprise at least one peroxide decomposing at high temperature, i.e. it does not decompose until a relatively high temperature is reached, and also at least one peroxide decomposing at intermediate temperature.

The distinction between peroxides decomposing at high temperature and peroxides decomposing at intermediate temperature is made by means of the temperatures at which the half lives to for the decomposition are 10, 1 or 0.1 hours; it is most usual to report the temperature at which the half life is 0.1 hour.

Peroxides decomposing at low temperature have a half life of 0.1 hour at temperatures of less than 100° C.

Peroxides decomposing at intermediate temperature have a half life of 0.1 hour at temperatures of from 100 to 140° C.

Peroxides decomposing at high temperature have a half life of 0.1 hour at temperatures above 140° C.

There is a wide choice of commercially available peroxides, for example the Trigonox® or Perkadox® products from Akzo Nobel.

Examples of commercially available peroxides decomposing at low temperature are:

Di(2-ethylhexyl) peroxydicarbonate, tert-amyl peroxyneodecanoate, tert-butyl peroxyneodecanoate, tert-butyl peroxypivalate and tert-amyl peroxypivalate.

Examples of commercially available peroxides decomposing at intermediate temperature are:

Didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo) cyclohexane as isomer mixture, tert-butyl perisononanoate, 1,1-di(tert-butylperoxy)-3,3,5-trimethylcyclohexane, 1,1-di (tert-butylperoxy)cyclohexane, methyl isobutyl ketone peroxide, tert-butylperoxy isopropyl carbonate, 2,2-di-tert-butylperoxy)butane and tert-butyl peroxyacetate.

Examples of conventional commercially available peroxides decomposing at high temperature are:

tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butyl cumyl peroxide, 2,5-dimethyl-2,5-di(tert-butylperoxy) hex-3-yne, di-tert-butyl peroxide, 1,3-diisopropyl monohydroperoxide, cumene hydroperoxide or tert-butyl hydroperoxide.

The trimeric ketone peroxides of the formula I can be classified as peroxides decomposing at high temperatures.

The half lives of peroxides are usually determined by one of the generally used laboratory methods:

Firstly, a plurality of ampoules or test tubes containing a dilute solution having a concentration $c_0$ of less than 0.2 mol/l, preferably less than 0.1 mol/l, of the peroxide to be examined are prepared, choosing an inert solvent, i.e. a solvent which does not react with peroxides, as solvent; preference is given to benzene, toluene or chlorobenzene.

These ampoules are thermostatted at a defined temperature. At defined time intervals, e.g. 1, 2, 3, 4, 6, 8 hours, an ampoule is taken out, cooled quickly and then analyzed for the residual peroxide content $c_t$. This analysis is preferably carried out titrimetrically. The results are evaluated graphically. If the relative concentration is plotted logarithmically against the reaction time, the half life at $c_t/c_0=0.5$ on the ordinate can be read off. To determine the temperature dependence, this measurement is repeated at various temperatures.

The peroxides B) used are preferably one or more peroxides decomposing at intermediate temperature or mixtures of one or more peroxides decomposing at intermediate temperature and one or more peroxides decomposing at low temperature.

As polymerization initiators to be used according to the present invention, particular preference is given to peroxide mixtures comprising A') from 1 to 50 mol % of one or more trimeric ketone peroxides as peroxides decomposing at high temperature, preferably from 2 to 40 mol % and particularly preferably from 3 to 30 mol %;

B') from 20 to 99% by weight of one or more conventional peroxides as peroxides decomposing at intermediate temperature, preferably from 30 to 98 mol % and particularly preferably from 40 to 97 mol %;

C') from 0 to 79% by weight of one or more conventional peroxides as peroxides decomposing at low temperature, preferably from 0 to 68 mol % and particularly preferably from 0 to 57 mol %, where A'), B') and C') at up to 100%.

In the first reaction zone, particular preference is given to using an initiator mixture of from 1 to 10 mol % of A'), from 40 to 60 mol % of B') and from 40 to 60 mol % of C'), where A'), B') and C') add up to 100%. In the following reaction zones, preference is given to using a mixture of from 5 to 40 mol % of A') and from 60 to 95 mol % B').

The peroxides, which are extremely shock- and impact-sensitive in the pure state, are advantageously introduced as a solution in aliphatic hydrocarbons, for example octane and isododecane. The peroxide mixtures are present in the solutions in proportions of from 5 to 60% by weight, preferably from 15 to 40% by weight. According to the present invention, the polymerization initiator mixtures used according to the present invention are introduced in amounts of from 0.5 to 100 mol/t of polyethylene produced, preferably from 1 to 10 mol/t and particularly preferably from 1 to 5 mol/t of polyethylene produced.

The polymerization is carried out at pressures of from 500 to 5000 bar, preferably from 1500 to 3500 bar and particularly preferably from 2000 to 3300 bar. The reaction temperatures are above 40° C. The reaction temperature is from 150° C. to 350° C., preferably from 250° C. to 330° C. and very particularly preferably from 270° C. to 320° C.

The process of the present invention can be used both for homopolymerization and for copolymerization of ethylene with other monomers, provided that these monomers undergo free-radical polymerization with ethylene under high pressure. Examples of suitable copolymerizable monomers are $\alpha,\beta$-ethylenically unsaturated $C_3$–$C_8$-carboxylic acids, in particular maleic acid, fumaric acid, itaconic acid, acrylic acid, methacrylic acid and crotonic acid, $\alpha,\beta$-ethylenically unsaturated $C_3$–$C_{15}$-carboxylic esters or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride and $\alpha$-olefins such as propene, 1-butene, 1-pentene, 1-hexene, 1-octene or 1-decene. In addition, it is possible to use vinyl carboxylates, particularly preferably vinyl acetate, as comonomers. The proportion of comonomer or comonomers in the reaction mixture is from 1 to 45% by weight, preferably from 3 to 35% by weight, based on the amount of ethylene monomer.

In addition, the flowing reaction mixture can, according to the present invention, contain from 0 to 40% by weight, preferably from 1 to 30% by weight, of polyethylene, based on the total weight of the monomers.

In the process of the present invention, the molar mass of the polymers to be prepared can be regulated in a customary fashion by addition of molecular weight regulators. Examples of suitable regulators are aliphatic and olefinic hydrocarbons such as pentane, hexane, cyclohexane, propene, pentene or hexene, ketones such as acetone, diethyl ketone or diamyl ketone, aldehydes such as formaldehyde or acetaldehyde and saturated aliphatic alcohols such as methanol, ethanol, propanol or butanol. Particular preference is given to using saturated aliphatic aldehydes, in particular propionaldehydes, or a-olefins such as propene or hexene. The molecular weight regulator is preferably metered into the reaction mixture upstream of the tube reactor. It can also be metered in together with the polymerization initiator at the various points along the tube reactor.

In a preferred embodiment, polymerization initiator is metered in along the tube reactor at from 2 to 6 points, particularly preferably at from 3 to 5 points, so that from 2 to 6 reaction zones are obtained. Here, the total amount of monomer and, if desired, comonomer is preferably introduced at the reactor inlet.

In another preferred embodiment, the tube reactor has at least two reaction zones into each of which additional cold or preheated monomer and/or cold or preheated comonomer are/is introduced as fresh gas stream before the beginning of each reaction zone. Preference is given to at least three successive reaction zones, with the polymerization having to be restarted in each zone by addition of the appropriate initiators. Reactors suitable for carrying out the process are, inter alia, tube reactors which are provided with a series of inlet pipes for the initiator and for the introduction of further amounts of monomer.

Reactors as are described in U.S. Pat. Nos. 4,135,044 and 4,175,169 can also be operated using the process of the present invention. Here, the tube reactor has a comparatively small tube diameter in each reaction zone from the introduction point for initiator to the temperature maximum compared to the enlarged tube diameter in the subsequent cooling zone (from the temperature maximum to the next introduction point for initiator). This enables a high conversion to be achieved at a relatively low pressure drop over the length of the reactor.

The tube reactor is usually provided with a cooled jacket to remove the heat of reaction. Preference is here given to a hot water jacket which may also be segmented.

The ratio of length to diameter of the tube reactor is preferably in the range from 10000 to 50000, particularly preferably from 15000 to 35000.

In general, the mean residence time of the reaction mixture in the tube reactor is from 30 to 300 seconds, in particular from 30 to 120 seconds.

After the last introduction of polymerization initiator, the reaction mixture is cooled so as to be able to discharge the product from the reactor. The reaction mixture is ejected at the outlet end of the tube reactor by means of an appropriate high-pressure let-down valve system. After discharge of the reaction mixture, the polymer is separated from unreacted ethylene and, if appropriate, unreacted comonomer by depressurization, after which the monomers are generally recirculated to the reactor.

This process of the present invention can be carried out in an analogous manner with upstream installation of a back-mixed reactor. After the polymerization has abated in the backmixer, the polymerization mixture together with still unreacted monomers is introduced via a high-pressure pipe, which may additionally be connected to a heat exchanger, into the tube reactor where the pressure is continued as described above. In general, the mean residence time of the mixture in the backmixed reactor is from 10 to 100 seconds, in particular from 10 to 30 seconds, and the mean residence time in the tube reactor is from 10 to 200 seconds, in particular from 10 to 100 seconds.

The process of the present invention enables ethylene homopolymers and copolymers having particularly useful properties to be prepared. The polymers can also be prepared in a safe and exactly reproducible fashion by means of the process of the present invention, without explosive decomposition of ethylene occurring in the reactors. The polymers of the present invention have densities of from 918 to 930 kg/m$^3$, preferably from 918 to 926 kg/m$^3$ and particularly preferably from 920 to 925 kg/m$^3$. The density can, for example, be influenced by means of the chain regulators and/or the comonomers. The melt flow index in accordance with DIN 53 735 (190° C./2.16 kg) is usually less than 50 g/10 min, in particular less than 10 g/10 min and particularly preferably less than 5 g/10 min. Polymers having densities over 918 kg/m$^3$ can be prepared at conversions of more than 25% in the manner described above.

The process of the present invention makes it possible to achieve a significant reduction in the amount of free-radical initiator added for the same amount of LDPE (low density polyethylene) produced and thus to operate the high-pressure polymerization in a more economical manner.

Furthermore, the polymers, in particular LDPE, prepared by the process of the present invention are particularly well suited to the production of films or film products. Films or film products produced from the polymers of the present invention have excellent optical and mechanical properties. Preference is given to films having an elongation at break perpendicular to the machine direction of greater than 750% and a dart drop impact strength of greater than 100. The processability of these polymers is also particularly good because the pressure buildup in the extruder just in front of the die is lower.

In addition, the process of the present invention has the further advantage that stable reactor operation can be maintained at unusually high maximum temperatures of up to 320° C. without a tendency for decomposition to occur.

The process is illustrated by the examples.

EXAMPLE AND COMPARATIVE EXPERIMENTS

Examples 1–3 and Comparative Experiments A, B, C and D were carried out in a tubular reactor having a length of 560 m and a ratio of length to diameter of 33000. The polymerization initiators were fed as solutions in aliphatic hydrocarbons directly to the feed points of the tube reactor by means of high-pressure piston pumps. The length of the reaction zones in the reactor was determined by the position of the feed points. The oxygen-free ethylene was compressed in a plurality of stages to the respective reaction pressure, admixed with a molar mass regulator and fed to the inlet points of the tube reactor. Propionaldehyde was used as molar mass regulator.

The heat of reaction liberated in the polymerization was removed from the reaction mixture by means of a cooling circuit. The resulting polymer was separated from unreacted ethylene and other low molecular weight compounds in a customary and known manner in the separators installed downstream of the reactor and was discharged and pelletized by means of an extruder and granulator. Unreacted ethylene was purified in a plurality of stages and recirculated to the suction side of the compressor. Details may be found in Ullmans Encyclopädie der technischen Chemie, Volume 19, pp. 169–178 (1980).

The following abbreviations were used:
tert-butyl perpivalate: TBPP,
tert-butyl perisononanoate: TBPIN,
3,6,9-trimethyl-3,6,9-triethyl-1,4,7-triperoxonane: TPN,
di-tert-butyl peroxide: DTBP,
methyl isobutyl ketone peroxide: MIKP.

The properties of the resulting polymers were determined by the following methods:
the melt flow index (MFI) was determined at 190° C. and a load of 2.16 kp in accordance with ISO 1133 and the density was determined in accordance with ISO 1183.

Blown films were produced from the polymers in a customary and known manner (cf. Ullmans Encyclopädie der technischen Chemie, Volume 11, p. 673 (1980)), and the use properties of these were determined by the following methods:
light scattering of the films in accordance with DIN 53 490,
gloss of the films in accordance with DIN 67 530,
elongation at break of the films in accordance with ISO 527,
the puncture strength of the films in accordance with DIN 53 373,
the dart drop impact value in accordance with ASTM D 1709/A.

The drawability of the blown film was determined in a customary and known manner during blown film extrusion while the film was being drawn off and wound up. Here, the takeoff speed was increased by 2 m/min in steps of 20 s until the film tore.

Examples 1–3

According to the Present Invention Using 3,6,9-trimethyl-3,6,9-triethyl-1,4,7-triperoxonane (TPN)

The examples according to the present invention describe the preparation (Table 1) and the properties (Table 2) of the polymers or the films prepared therefrom which can be compared directly with the polymers described in the comparative examples.

A mixture of tert-butyl perpivalate (TBPP), tert-butyl perisononanoate (TBPIN) and 3,6,9-trimethyl-3,6,9-triethyl-1,4,7-triperoxonane (TPN) dissolved in isododecane was fed to the inlet point of the tube reactor so as to start the polymerization. At the second feed point of the tube reactor, at which the reaction temperature had dropped back to 250° C. after the first temperature maximum, a mixture of tert-butyl perisononanoate (TBPIN) and 3,6,9-trimethyl-3,6,9-triethyl-1,4,7-triperoxonane (TPN) dissolved in isododecane was introduced. At the third feed point of the tube reactor, at which the reaction temperature had dropped back to below 250° C. after the second temperature maximum, a mixture of tert-butyl perisononanoate (TBPIN) and 3,6,9-trimethyl-3,6,9-triethyl-1,4,7-triperoxonane (TPN) dissolved in isododecane was introduced.

No difficulties were encountered in carrying out these experiments: the change of product type proceeded quickly and smoothly. The feared explosive decompositions of the reaction mixture at relatively high temperature peaks of 320° C.–325° C. also did not occur.

Comparative Examples A, B and C (Without 3,6,9-trimethyl-3,6,9-triethyl-1,4,7-triperoxonane (TPN))

3.2 t/h of ethylene were admixed with 1.0–3.0 l/h of propionaldehyde (depending on the MFI), compressed to 3000 bar, heated to 155° C. in a preheater and fed to the inlet of the tube reactor. The peroxide TPN used according to the present invention was replaced by the conventional peroxide DTBP in the respective mixture at each inlet point.

The peak temperatures in the $1^{st}$, $2^{nd}$ and $3^{rd}$ reaction zones are shown in Table 1 for the individual experiments. The resulting ethylene polymer was freed of ethylene and low molecular weight impurities in a customary and known manner in high-pressure and low-pressure separators, stored in hoppers and processed to form blown films. Table 1 also gives information on the conversion in the reaction, of the specific consumption of peroxides decomposing at high temperature and the total peroxide consumption. The physicochemical properties of the ethylene homopolymer and the use properties of the blown film produced therefrom are summarized in Table 2.

Comparative Example D

This example was carried out in a manner similar to Comparative Examples A, B and C, except that a peroxide mixture decomposing at high temperature (tradename= MIKP) was used in place of DTBP as peroxide decomposing at high temperature. The results in Table 1 show that, at the same peak temperature of 303° C., significantly lower polymer densities (0.9190 g/cm² compared to 0.9240 g/cm² for DTBP and TPN) were achieved. The product properties are therefore not comparable.

In addition, a tendency for the reaction mixture to decompose spontaneously was observed when MIKP was used.

TABLE 1

| Experiment | Tmax [° C.] | Peroxides introduced [mol/h] | | | | | | Density [g/cm³] | MFI [g/10 min] | Conversion [%] | PO consumption [mmol/kg of PE] | |
|---|---|---|---|---|---|---|---|---|---|---|---|---|
| | | 1st Init. | | 2nd Init. | | 3rd Init. | | | | | High temp. | Total |
| Ex. A | 303 | TBPP | 0.32 | | | | | 0.9240 | 0.9 | 26.7 | 0.8 | 2.1 |
| | | TBPIN | 0.39 | TBPIN | 0.19 | TBPIN | 0.20 | | | | | |
| | | DTBP | 0.19 | DTBP | 0.22 | DTBP | 0.24 | | | | | |
| Ex. 1 | 303 | TBPP | 0.40 | | | | | 0.9240 | 0.8 | 27.5 | 0.3 | 1.7 |
| | | TBPIN | 0.46 | TBPIN | 0.16 | TBPIN | 0.16 | | | | | |
| | | TPN | 0.03 | TPN | 0.03 | TPN | 0.03 | | | | | |
| Ex. B | 305 | TBPP | 0.27 | | | | | 0.9240 | 2.0 | 28.5 | 0.8 | 1.7 |
| | | TBPIN | 0.27 | TBPIN | 0.16 | TBPIN | 0.14 | | | | | |
| | | DTBP | 0.27 | DTBP | 0.19 | DTBP | 0.28 | | | | | |
| Ex. 2 | 310 | TBPP | 0.41 | | | | | 0.9240 | 2.1 | 29.1 | 0.4 | 1.7 |
| | | TBPIN | 0.47 | TBPIN | 0.17 | TBPIN | 0.17 | | | | | |
| | | TPN | 0.05 | TPN | 0.04 | TPN | 0.04 | | | | | |
| Ex. C | 315 | TBPP | 0.27 | | | | | 0.9230 | 4.0 | 30.9 | 1.3 | 2.2 |
| | | TBPIN | 0.27 | TBPIN | 0.16 | TBPIN | 0.23 | | | | | |
| | | DTBP | 0.40 | DTBP | 0.32 | DTBP | 0.53 | | | | | |
| Ex. 3 | 320 | TBPP | 0.45 | | | | | 0.9230 | 4.1 | 31.4 | 0.7 | 1.9 |
| | | TBPIN | 0.45 | TBPIN | 0.19 | TBPIN | 0.19 | | | | | |
| | | TPN | 0.08 | TPN | 0.08 | TPN | 0.08 | | | | | |
| Ex. D | 303 | | | | | | | 0.9190 | 0.8 | 26.7 | not able to be determined | |

TABLE 2

| | Ex. A | Ex. 1 | Ex. B | Ex. 2 | Ex. C | Ex. 3 |
|---|---|---|---|---|---|---|
| Temperature [° C.] | 175 | 168 | 173 | 157 | 167 | 148 |
| Machine pressure [bar] | 281 | 240 | 212 | 184 | 186 | 165 |
| Output [kg/h] | 22.0 | 22.0 | 22.0 | 22.0 | 21.0 | 23.0 |
| Draw-down 1 [μm] | 21 | 20 | 16 | 12 | 12 | 11 |
| Film thickness [μm] | 50 | 51 | 50 | 50 | 50 | 50 |
| Ult. strength MD [MPa] | 31.0 | 30.5 | 27.0 | 28.9 | 23.0 | 25.5 |
| Ult. strength CD [MPa] | 22.0 | 24.6 | 20.0 | 21.6 | 19.0 | 19.0 |
| Ult. Elongation MD [%] | 223 | 299 | 305 | 486 | 367 | 430 |
| Ult. Elongation CD [%] | 731 | 779 | 710 | 780 | 700 | 780 |
| Byk clarity [%] | 93.7 | 94.1 | 94.3 | 95.3 | 95.4 | 94.9 |
| Scattering [%] | 16.0 | 16.6 | 14.0 | 12.0 | 10.0 | 10.0 |
| Haze [%] | 7.0 | 7.1 | 7.0 | 6.0 | 7.0 | 6.5 |
| Gloss 20° [%] | 44 | 42 | 52 | 56 | 65 | 57 |
| Gloss 60° [%] | 93 | 96 | 98 | 106 | 105 | 99 |
| Dart drop impact [g] | 114 | 147 | 100 | 125 | 90 | 108 |
| Puncture energy [J/mm] | 5.5 | 5.4 | 4.4 | 5.1 | 3.8 | 3.8 |
| Blocking force [N/15 mm] | 113 | 70 | 113 | 92 | 59 | 112 |
| COF [%] | 106 | 87 | 108 | 118 | 112 | 120 |
| Film rating, FN | 2.5 | 2.0 | 2.6 | 2.0 | 3.2 | 2.0 |

We claim:

1. A process for preparing ethylene homopolymers or copolymers in a tube reactor at from 160° C. to 350° C. and pressures in the range of 500 to 5000 bar, with or without use of molar mass regulators, wherein a peroxide mixture comprising A) from 1 to 50 mol % of one or more trimeric ketone peroxides of the formula I as peroxides decomposing at high temperature

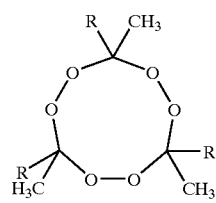

where the radicals R are identical or different and are selected from among alkyl groups or aryl groups, and B) from 50 to 99 mol % of one or more conventional polymerization initiators, the mol % being based on the total weight of the peroxide mixture is used as a polymerization initiator.

2. A process as claimed in claim 1, wherein the radicals R are selected from among linear $C_1$–$C_8$-alkyl groups.

3. A process as claimed in claim 1, wherein all the radicals R are ethyl.

4. A process as claimed in claim 1, wherein the polymerization initiator used is a peroxide mixture comprising A') from 1 to 50 mol % of one or more trimeric ketone peroxides of the formula I as peroxides decomposing at high temperature, B') from 20 to 99 mol % of one or more conventional peroxides as peroxides decomposing at intermediate temperature, and C') from 0 to 79 mol % of one or more conventional peroxides as peroxides decomposing at low temperature, where A'), B') and C') add up to 100%.

5. A process as claimed in claim 4, wherein the polymerization initiator used is a peroxide mixture comprising A') from 1 to 10 mol % of one or more trimeric ketone peroxides of the formula I as peroxides decomposing at high temperature, B') from 40 to 60 mol % of one or more conventional peroxides as peroxides decomposing at intermediate temperature, and C') from 40 to 60 mol % of one or more conventional peroxides as peroxides decomposing at low temperature, where A'), B') and C') add up to 100%.

6. A process as claimed in claim 1, wherein the initiators of component B) include one or more peroxides decomposing at intermediate temperature and/or one or more peroxides decomposing at low temperature.

* * * * *